Figure 1:
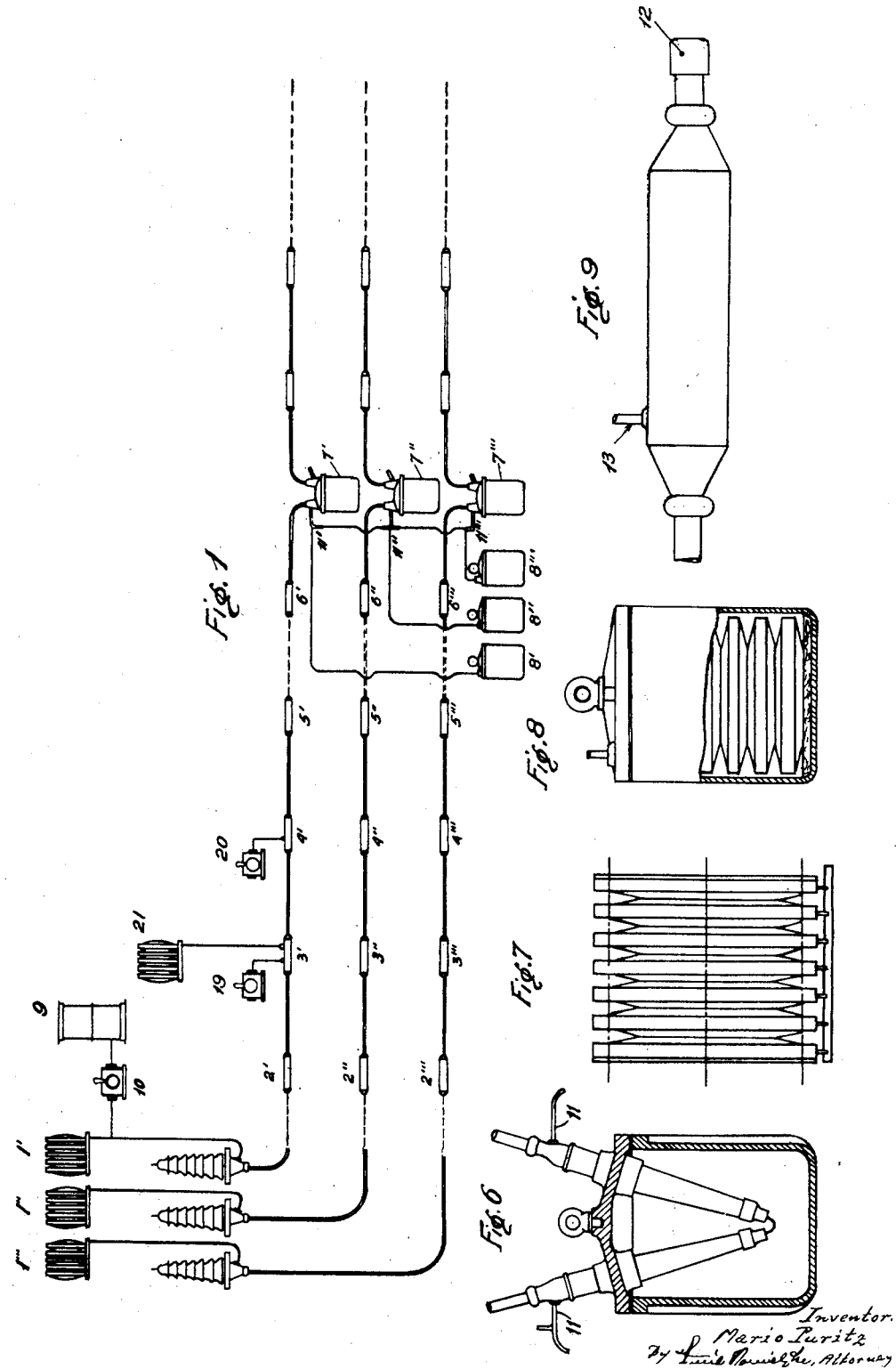

Oct. 18, 1938.   M. PURITZ   2,133,398
ELECTRIC CABLE AND METHOD OF REPAIRING THE SAME
Filed April 25, 1929   2 Sheets-Sheet 1

Oct. 18, 1938.  M. PURITZ  2,133,398
ELECTRIC CABLE AND METHOD OF REPAIRING THE SAME
Filed April 25, 1929  2 Sheets-Sheet 2
Fig. 2
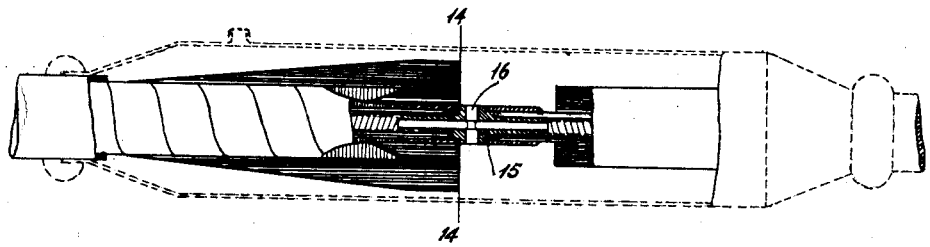
Fig. 3.
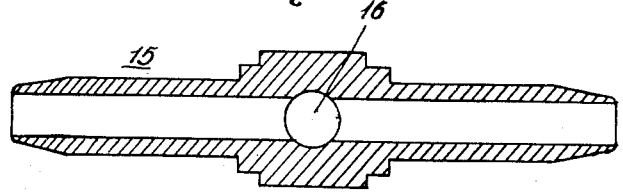
Fig. 4
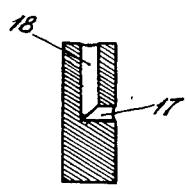
Fig. 5
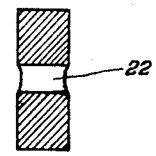
Fig. 4a
Fig. 5a
Inventor.
Mario Puritz
By 
Attorney.

Patented Oct. 18, 1938

2,133,398

UNITED STATES PATENT OFFICE 2,133,398

ELECTRIC CABLE AND METHOD OF REPAIRING THE SAME

Mario Puritz, Piccadilly, London, England, assignor to Societa Italiana Pirelli, Milan, Italy, a corporation of Italy Application April 25, 1929, Serial No. 358,092

25 Claims. (Cl. 173—268)

My invention is directed more specifically to that type of cable designed to be placed in underground conduits, which comprises an insulated conductor, an enclosing metal sheath and one or more ducts or channels within the sheath which are filled with insulating fluid, such as oil for example, under a pressure greater than that of the atmosphere. It is the common practice for high tension circuits of multiphase systems of alternating current distribution to provide a separate cable for each of the phases. Each cable is made of relatively short lengths for convenience in handling and installing; and the lengths, after being installed, are united electrically by suitable hollow connectors through which the insulating fluid is free to flow. To limit the fluid pressure in any one or more parts of the cable due to hydrostatic head, suitable stop joints are provided where necessary, which joints permit the current to freely flow but prevent the flow of fluid from one section or part to another. These joints, or more strictly the casings thereof, are provided with means, commonly called "pigtails", by which a vacuum pump may be attached for evacuating the lengths of the cable associated therewith and through which insulating fluid may be introduced into the system. In practice a number of cable lengths are connected to each side of a stop joint.

Sealed fluid-containing reservoirs called "feeding reservoirs", and sealed reservoirs called "pressure reservoirs" are provided, both of which communicate with the duct or channel in each phase of the cable and into which fluid is free to flow from the cable as it heats and from which it flows into the cable as it cools. Suitable means such as pumps and tanks are provided whereby the feeding reservoirs may be supplied with additional degasified fluid to compensate for any leakage which may occur. The parts of the system are also provided with arrangements whereby they may be evacuated to remove air and other gases therefrom. Cable systems of the character described have been installed in New York city and Chicago and have been described in considerable detail in the technical press, as for example in the Proceedings of the A. I. E. E. meeting of November 28–30, 1927.

As will be evident from the foregoing the entire cable of each phase is filled with oil or other insulating fluid, and hence if a rupture of a sheath or joint casing thereof should occur the fluid will escape. On the other hand faults of a different character may develop in the cable length due to various causes. In any event when a length is injured from any cause it is necessary to remove it and substitute a new one. The problem is to accomplish this substitution without draining the entire cable or a long length thereof, or permitting the admission of air or moisture to the interior of the cable, for when a cable is drained wholly or in large part it has to be re-evacuated and treated and then re-filled with fluid, which is a very expensive operation and requires a considerable period of time.

My invention has for its object to provide an arrangement of parts and a method of procedure whereby a new length of cable may be substituted for an injured one without draining or otherwise affecting the other portions, and at the same time limiting any further or necessary treatment to the new length.

For a consideration of what I believe to be novel and my invention, attention is directed to the accompanying description and the claims appended thereto.

In the accompanying drawings which are illustrative of my invention, Figure 1 is a diagrammatic illustration of a high tension oil-filled underground cable system; Figure 2 is a sectional view of a cable joint for a cable of the hollow core type; Figure 3 is a sectional view of a connector; Figure 4 is a sectional view of a temporary valve or plug by means of which fluid is prevented from escaping from the cable at one side and the new cable section properly treated; Figure 4ª is an end view thereof; Figure 5 is a sectional view of a permanent valve or plug; Figure 5ª is an end view thereof; Figure 6 is a sectional and diagrammatic view of a fluid stop-joint; Figure 7 is a detail view of a feeding or oil supplying reservoir; Figure 8 is a detail view of a pressure reservoir; and Figure 9 is a detail view of a casing for a joint and a cap for temporarily stopping the flow of oil from the cable after the injured section has been severed therefrom.

The feeding reservoirs 1' 1" 1''' shown in Figure 1 are connected to the cable ends near the terminals by means of pipes. These reservoirs are of the collapsible type, like those described for instance in British patent to Emanueli, No. 255,034. One of these is more particularly illustrated in Figure 7. The abutting lengths of cable are joined together by means of joints 2' 2" 2''' . . . 6' 6" 6'''. These joints are made in such a manner that they electrically connect the hollow core conductor by means of a connector in which there is a longitudinal duct which permits the flow of oil from one length of cable to another.

On the connector the joint insulation is applied, and is enclosed in a protective casing, hermetically sealed to the sheaths of the two lengths of cable. The casing is provided with a pig-tail or hole equipped with a plug which permits communication between the interior of the casing and the external devices.

The entire cable line is divided into sections, each section being composed of one or more lengths of cable, adjacent sections being separated by means of stop joints. In Figure 1 are shown the stop joints 7' 7'' 7''', which limit the first section of the line. Following these stop joints a second section begins.

The stop joint, which is diagrammatically illustrated in Figure 6, may be of any suitable construction, as for example that shown in the Patent to Emanueli No. 1,698,051, issued January 8th, 1929. It is provided with suitable devices 11 commonly called "pig-tails" one on each side, which are adapted to receive the suction pipes of vacuum pumps used in evacuating the cable and later to receive the pipes for admitting degasified oil or other insulating fluid to the cable. These devices are so arranged that communication can be established between the oil duct or channel within the cable and the outside of the joint casing. In practice the stop joints of the different phases of a multiphase system of distribution are located close together, so that the insulating fluid from one phase may be conveyed through these pig-tail connections to one or more of the other phases. A simple way for example to accomplish this interconnection is to use short lengths of rubber hose and fasten the ends thereof securely to the pig-tails, suitable devices for pinching the hose to shut off the flow of fluid being provided wherever necessary. It will be apparent to those skilled in the cable art that by this simple method of procedure a variety of interconnections can be made to the end that an additional supply of insulating fluid may be rendered quickly available in case of a ruptured sheath, and in such manner that fluid in suitable amount may be supplied from opposite sides of the ruptured sheath or other part and in this manner prevent the entrance of air or moisture to the cable. In such a case a part of the fluid will be supplied by the reservoir or reservoirs associated with the particular phase and the remainder by the reservoir or reservoirs associated with another phase or cable section.

In Figure 1 is disclosed for example a connection, by means of pipes, between the three pig-tails of the stop joints 7' 7'' 7''', so that these may put into communication the oil ducts of the three cables forming the first section.

Some installations may also be provided with other types of reservoirs commonly called "pressure reservoirs". These latter serve to control the pressure of the oil at the end of the section remote from the point where the feeding reservoirs are placed. One of these reservoirs is particularly illustrated in Figure 8, and they can be of any of the types described in the British Emanueli Patent No. 267,059. In the system shown in Figure 1 the pressure reservoirs 8' 8'' 8''' are shown at the end of the first section.

It is convenient that in a cable system there be an arrangement capable of feeding with insulating fluid the feeding reservoirs situated at the end of the line to compensate for any leakage of insulating fluid in the case of fault in the line.

In the installation shown in Figure 1 such an arrangement is provided by a reservoir 9 connected by means of a tube to one of the reservoirs, 1' for example. In this tube a pump 10 is inserted which takes up oil from the reservoir 9 and forces it into the feeding reservoir 1'.

To carry out the operation of repairing a cable system according to the present invention, it is first of all necessary to maintain the entire section of faulty cable under oil pressure, a supply of oil being provided from both sides of the fault. In the case of the installation illustrated in Figure 1, let us suppose that the fault is in the first section of the line between the joints 3' and 4'. In order to repair the fault, supposing that at one end of the faulty section the feeding reservoirs 1' 1'' 1''' are present, it is necessary to provide a supply of insulating oil from the other end of the section. This can be done by applying to the faulty cable an auxiliary reservoir on a joint placed near this other end or by establishing a connection at same between the damaged and undamaged cables. In Figure 1 these connections are shown, being effected between the pig-tails 11' 11'' 11''' of the three stop joints 7' 7'' 7''' at the end of the section. I can then proceed to cut the damaged length between the joints 3' and 4', being sure that the presence of the supply of oil will not permit air or moisture to enter the cable. The remaining stub ends are at once closed by applying a metal cap. Figure 9 represents the casing of one of the two joints with the piece of cut cable closed by the cap 12. In this figure is also shown the connection 13 adapted to receive the pipes of the vacuum pump and the pipes for admitting insulating fluid.

The damaged length is now removed and the new length substituted.

The joint casing between the damaged and undamaged lengths is then opened and removed and the joint insulation cut transversely in the direction 14—14, near the centre of the joint as shown in Figure 2, the insulation towards the new length being removed, thus leaving exposed the centre of the usual connector 15. A transverse bore 16 is then drilled with a suitable device, it being a little larger in diameter than the duct inside the connector, and intersecting the same.

In Figure 3 the connector 15, which is of a well known type, is shown with its internal duct and the bore 16 so made. The flow of oil from the bore 16 is then interrupted by closing the latter with a plug. A plug suitable for this purpose is represented in Figure 4. The one shown is cylindrical but it may also be slightly conical. It is provided with an axial passageway 18 and with a radial port 17 adapted to register with the internal duct of the connector. This plug has a diameter equal to that of the bore 16 made in the connector, and is introduced into said hole taking care to have the opening 17 directed towards the new length of cable. In this way the flow of oil from the adjacent undamaged length is cut off.

It is now necessary to disconnect the remaining stub end of the conductor of the damaged length from the connector and to connect in its place the conductor of the new length. For this purpose the exposed part of the connector is heated until the solder securing it inside of the hollow conductor stub melts without however melting the solder at the other end covered with the old joint insulation; and in this way the remaining stub end of the conductor of the damaged length of cable can be removed. The conductor of the new length is then attached in its place by soldering it to the connector, care being taken not to unsolder the other end which is cooled by the insulating oil and the old joint insulation.

The same operation is repeated for the joint at the other end of the damaged length.

On each of the two joints a provisional casing provided with a pump connection is applied, and by means of this connection vacuum is made in the casing and, through passages 17 and 18 in the plug, in the new length of cable, after which oil is allowed to flow in. In Figure 1 are represented the connections of the joitns 3' and 4' to the vacuum pumps 19 and 20, and a reservoir 21 which is used to fill the new length with insulating oil.

When the desired amount of vacuum has been made in the new length of cable the communication between the casing and the vacuum pump 19 is closed, and that of the reservoir 21 is opened.

In the case shown in Figure 1 only one reservoir has been used to supply the oil to the cable, this being applied to one end of the new length. It is, however, also possible to use two oil reservoirs, one for each end.

When the new length of cable has been completely filled with insulating oil, a feeding reservoir still being attached to one end, the provisional casing at the other end is opened and the plug illustrated in Figure 4 is changed for the new plug shown in Figure 5, this new plug being provided with a transverse bore 22. In this way the communication of the oil between the new length and the adjacent length is established.

It is now possible to remove the oil reservoir from the other end of the length of cable and open the second provisional casing, substituting, in place of the old plug, a new one having a transverse bore as shown in Figure 5. The communication of the oil in the entire system is now reestablished and the oil supply near the stop joints at the end of the section to be repaired can be discontinued; that is, the connection between the pig-tails 11' 11'' 11''', shown in Figure 1, can be removed or any eventual reservoirs which may have been used.

The part of the old insulation which still exists is now removed from the joints, and new insulation is applied on the entire joint, which is then enclosed in a permanent metal casing soldered to the cable sheath. Vacuum is made in the casing which is then filled with oil and finally, removing the communication to the exterior, the casing is closed.

What I claim as new and desire to secure by Letters Patent of the United States is:—

1. The method of repairing an oil filled hollow conductor cable which comprises, cutting out and removing the damaged length between joints and substituting a new length of undamaged cable, sealing up the undamaged cut ends, maintaining a greater pressure of oil in the interior of the cable than the external pressure to cause a tendency to produce an outward flow, opening the joint and removing the joint insulation, shutting off the flow of oil in the central duct at the undamaged end, disconnecting and removing the conductor ends at the joints, joining the conductor ends of the new cable length to the undamaged ends of the cable, connecting by provisional joint casings the sheath of the new length of cable to the sheath ends of the undamaged cable, evacuating the provisional joint and the duct of the new length through at least one of the two provisional joints, opening the casing of one joint while oil is still being admitted into the new length through the other joint, re-establishing in the first joint oil communication between the new length and the undamaged length, eliminating the admission of oil in the new length, re-establishing in the second joint oil communication between the new length and the undamaged length, applying joint insulation to the joints, enclosing the joint insulation in metal casings, joining the adjacent lead sheaths, evacuating said casings and impregnating the joints with oil, and sealing off said casings.

2. In the repair of an oil filled cable having a hollow conductor, the adjacent lengths of which are joined by a connector soldered to the ends of the conductor and having a passageway uniting the same, the method of substituting a new length of cable for a damaged length, which comprises removing the joint insulation from the central part and from one end only of the connector in order to expose the same, closing the passageway in the connector to shut off the flow of oil, heating the exposed end of the connector until the solder thereof melts without melting the solder at the other end, removing the conductor of the damaged length, inserting the new conductor to be joined and sweating the same to the connector without unsoldering the other end, said other end being cooled by the insulating oil and by the old joint insulation, and finally again opening the passageway in the connector.

3. In the repair of an oil filled cable having a hollow conductor, adjacent lengths of which are connected by a tubular connecting sleeve, the method of unsoldering the damaged end which comprised closing off the duct in the sleeve, draining the damaged end, cooling the good end of the sleeve with oil under pressure and with a wrapping of insulation, and heating the exposed end of the sleeve to unsolder the damaged conductor.

4. In an oil filled cable, the combination of a pair of abutting cable lengths having hollow conductors, a hollow tubular sleeve secured to said conductors, a transverse passageway through said sleeve and a plug in said transverse passageway, said plug having an axial passageway and a radial port, said radial port being adapted to communicate with the duct in the sleeve at one side of the plug.

5. In an oil filled cable, the combination of adjacent lengths of hollow conductor cable, a tubular connector secured to the adjacent ends of the hollow conductors, a seat in the connector, a ported plug lying in said seat, said plug having a passageway to provide communication between the duct in the sleeve on one side of the plug to the exterior of the connector, and joint insulation wrapped about the insulation of one cable length and extending over one end of the connector.

6. In combination with a cable having a conductor, insulation therefor, and a lead sheath, there being a longitudinal duct for liquid insulation, means for supplying liquid insulation under pressure to said duct, and means inside the cable structure and insulated from said sheath for shutting off said longitudinal duct on each side of a fault to shut off wastage of oil and the entry of air while a repair is being made.

7. The method of repairing a line consisting of oil filled cable having an oil passageway, which comprises maintaining oil pressure on the affected cable, cutting out and removing the damaged section of cable, temporarily closing the remaining cut end or ends of the cable, opening a joint between the good cable and the adjacent remaining end, stopping the flow of oil out of the cable at the joint, removing at the joint the part remaining from cutting the cable, joining a new length of cable to the undamaged part of the joint, and connecting the oil passageways to the new length with the old length, wrapping the joint with insulation, enclosing the joint in an outer casing and impregnating the joint inside the casing with oil.

8. In combination, insulated conductors each having a central duct, a connector body having an enlarged central portion, and end portions of reduced cross-section, each of which enters the duct of and is united with a conductor, said body having a longitudinal bore joining the conductor ducts and also a transverse opening in the enlarged portion communicating with said bore, valve means cooperating in said transverse opening for controlling the flow of fluid through said bore and from said bore to the outside of said connector, and a body of insulation enclosing the connector and the adjacent insulated conductor ends.

9. The method of replacing a damaged length in a system of jointed lengths of sheathed cable having a conductor united by hollow metallic connectors and containing liquid under pressure, which method comprises removing insulation from the ends of the damaged length to expose the connectors, stopping the flow of liquid through the connectors from the undamaged lengths to the damaged length while maintaining the undamaged lengths filled with liquid, removing the ends of the conductor of the damaged length from the connectors, installing the new length in position while the flow of liquid is stopped, uniting the ends of the conductor of the new length with the connectors, establishing communication for the liquid between the undamaged lengths of cable and the new length, reinsulating the connectors and the ends of the cable united thereby, enclosing the connectors and their insulations in casings, and sealing the ends of the casings to the sheaths of the old and new cable lengths.

10. The method of replacing a damaged length in a system of jointed lengths of sheathed cable having a conductor united by metallic connectors and containing liquid under pressure, which method comprises removing approximately one-half of the insulation from the joints to partially expose the connectors uniting the damaged and undamaged lengths, stopping the flow of liquid into the damaged length at both ends thereof from the undamaged lengths, cutting the conductor of the damaged length near the ends thereof, removing the damaged length and substituting a new one, disconnecting the ends of the conductor of the damaged length from the connectors without disturbing their union with the undamaged lengths, uniting the ends of the conductor of the new length with the connectors, removing the remainder of the insulation on the joints, establishing a communication for liquid between the undamaged lengths and the new, reinsulating the connectors and the adjacent ends of the conductors, and enclosing the joints and their insulation with casings sealed fluid-tight to the sheaths.

11. In the repairing of sheathed cables of the hollow core type containing liquid under pressure and made up of lengths united by joints comprising metallic connectors having longitudinal ducts therethrough and soldered to the adjacent conductor ends, such joints being covered with insulation, the method of replacing a damaged cable length which comprises removing the insulation from that half only of the joint at each end of the damaged length adjacent the same, to partially expose the connector, stopping the flow of liquid through the duct of the connector into the damaged length at both ends and establishing communication between the portion of such duct adjacent the damaged length and the exterior of the connector, heating the exposed end of the connector to melt the solder, without affecting the other end thereof, removing the damaged length, placing a new length in position and uniting the end of the conductor thereof to the said connector, removing the air from the duct of the connector and causing the same to be filled with oil, shutting off communication between such duct and the exterior of the connector and establishing a communication for liquid through said duct between the hollow core of the new cable length and that of the adjacent lengths, and then reinsulating and finishing the joint.

12. In the repairing of sheathed cables of the hollow core type containing liquid under pressure and made up of lengths united by joints comprising metallic connectors having longitudinal ducts therethrough and soldered to the adjacent conductor ends, such joints being covered with insulation, the method of replacing a damaged cable length which comprises removing the insulation from that half only of the joint at each end of the damaged length adjacent the same, to partially expose the connector, stopping the flow of liquid through the duct of the connector into the damaged length at both ends, unsweating the conductor ends of the damaged length from the exposed ends of the connectors without disturbing the union of the latter with the undamaged lengths, placing a new length in position and uniting the ends of the conductor thereof to said connectors, removing the remainder of the insulation from the joints, establishing a communication for liquid through the ducts of the connectors between the hollow core of the new cable length and that of the adjacent undamaged lengths, and then reinsulating and finishing the joints.

13. In the repairing of a fault in one of a plurality of parallel oil filled cables having longitudinal channels therein, and divided into sections by means of interposed stop joints, the method which comprises supplying oil under pressure to one end of the corresponding sections of such cables, connecting together the other end of two such sections, whereby oil tends to flow in both directions toward a leak in one of said sections, and then disconnecting and removing the faulty portion of the defective section and replacing it with a new portion.

14. The method of replacing an injured section of a hollow, fluid-filled cable system, which comprises cutting the injured section near the connectors which unite it with the uninjured sections, stopping the flow of fluid from the uninjured sections at said connectors, uniting the new section to the old by means of the connectors, supplying fluid to the new section through one of the connectors, insulating the connectors, and enclosing them in fluid-tight casings.

15. The method of replacing an injured section of a hollow, fluid-filled cable system, which comprises cutting the injured section near the connectors which unite it with the uninjured sections, stopping the flow of fluid from the uninjured sections at said connectors, connecting the new section to the old by means of the connectors, evacuating the new section, supplying fluid to the new section, reinsulating the connectors, and enclosing them in fluid-tight casings.

16. The method of replacing an injured section of a hollow fluid filled cable system which comprises cutting the injured section near its end joints, temporarily stopping the flow of fluid from the uninjured sections at the cut ends, removing insulation to expose the connectors between sections, interrupting the passage of fluid from the uninjured sections at the connectors, installing a new section for the injured one and uniting it by the connectors to the old sections, removing air from the new section, opening the connectors to establish a through passage for the fluid, insulating the connectors, and enclosing the same in an hermetically sealed casing.

17. The method of replacing an injured section of a fluid filled cable system which comprises cutting the ends of the injured section near its end joints, stopping the flow of fluid from the joint, removing the coverings from the joints adjacent the cut-out section to expose the connectors, closing the passages through the connectors, connecting the new section to the connectors, evacuating the new section and filling it with fluid, opening the passages through the connectors to permit fluid to freely flow between sections, insulating the connectors and adjacent parts of the cable sections, and hermetically sealing the joints thus formed in a casing.

18. The method of repairing an oil filled hollow conductor cable which comprises, cutting out and removing the damaged length between joints and substituting a new length of undamaged cable, sealing up the undamaged cut ends, maintaining a superior pressure of oil in the interior of the cable to cause a tendency to produce an outward flow, opening the joint and removing the joint insulation, cutting off the flow of oil in the central duct at the undamaged end, disconnecting and removing the conductor ends at the joints, joining the conductor ends of the new cable length to the undamaged ends of the cable, connecting by provisional joint sleeves the sheath of the new length of cable to the sheath end of the undamaged cable end, evacuating the provisional joint and the central duct of the new length, admitting oil to the duct of the new length, closing off the duct in the cable at all points, applying joint insulation to the joint, enclosing the joint insulation in metal sleeves joining the adjacent lead sheath, evacuating said sleeves and impregnating the joint with oil and sealing off said sleeves.

19. In an oil-filled cable, the combination of adjacent lengths of hollow conductor cable, a tubular jointing sleeve secured to the adjacent ends of the hollow conductors, said sleeve having a seat, and a ported plug lying in said seat, and closing the duct in the sleeve on one side, said plug having a passageway to provide communication between the duct in the sleeve on the other side of the plug and the exterior of the sleeve.

20. In combination in a cable joint, a connector having a longitudinal bore and having an enlarged central portion, said enlarged central portion having a transverse opening and a member seating in said opening and serving to control said bore, and means for holding a hollow conductor upon each end of the connector.

21. In combination in a cable joint, a conducting sleeve having a longitudinal bore and having an enlarged central portion, tubular conductors embracing the ends of the sleeve at each side of the enlarged central portion, and a transversely disposed member for controlling the bore.

22. In a cable system, the combination of a sheathed insulated conductor having a longitudinal oil duct, said conductor being made up of suitable lengths joined together, and valves at said joints movable from an open position to a closed position for substantially closing off the oil duct to isolate one or more of the lengths of said cable, said valves being insulated from said sheaths.

23. In a cable joint, the combination with adjacent lengths of cable comprising hollow conductors of a hollow joining sleeve having a relatively thick central body, said body having a transverse bore and a plug seated in said bore and controlling the communication of the hollow conductor through said sleeve.

24. A fluid filled electric cable system comprising adjacent lengths of cable, insulation within each cable, a fluid duct in each cable for maintaining the insulation impregnated with fluid, and a communicating connection between the ducts of the two cable lengths, said connection including means operable from an open position permitting communication between the ducts to a closed position closing off communication between the ducts.

25. A connector for uniting sections of a fluid-filled cable which comprises a hollow member having sockets to receive the ends of the conductors, and a transversely extending member situated between the sockets and of a diameter greater than the bore of the connector which when moved to one position shuts off the passage through the connector and when moved to another position opens said passage.

MARIO PURITZ.